US012687816B2

(12) United States Patent
Kato

(10) Patent No.: US 12,687,816 B2
(45) Date of Patent: Jul. 21, 2026

(54) TIMEPIECE HAVING DECORATIVE PLATE AND SUPPORT PLATE

(71) Applicant: SEIKO EPSON CORPORATION, Tokyo (JP)

(72) Inventor: Hideo Kato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 414 days.

(21) Appl. No.: 18/345,534

(22) Filed: Jun. 30, 2023

(65) Prior Publication Data

US 2024/0004347 A1 Jan. 4, 2024

(30) Foreign Application Priority Data

Jul. 1, 2022 (JP) ................................ 2022-106881

(51) Int. Cl.
*G04B 19/06* (2006.01)
*G04B 9/00* (2006.01)

(52) U.S. Cl.
CPC .......... *G04B 19/065* (2013.01); *G04B 9/005* (2013.01)

(58) Field of Classification Search
CPC ...................................................... G04B 45/02
See application file for complete search history.

(56) References Cited

U.S. PATENT DOCUMENTS

| | | | | |
|---|---|---|---|---|
| 2,006,606 A * | 7/1935 | Roman | G04D 3/042 | 968/282 |
| D912,545 S * | 3/2021 | Macaluso | D10/39 | |
| 2015/0021190 A1* | 1/2015 | Schmitz | C25D 1/003 | 205/50 |
| 2015/0146503 A1* | 5/2015 | Nakanishi | G04B 19/223 | 368/21 |
| 2017/0031321 A1* | 2/2017 | Buttet | G04B 19/10 | |
| 2018/0348706 A1* | 12/2018 | Koike | G04B 19/241 | |
| 2020/0409309 A1* | 12/2020 | Verdon | G04B 45/02 | |
| 2021/0191324 A1* | 6/2021 | Oberson | G04B 45/0015 | |
| 2022/0413443 A1* | 12/2022 | Christan | G04B 47/044 | |

FOREIGN PATENT DOCUMENTS

| | | | |
|---|---|---|---|
| CH 699165 B1 * | 1/2010 | | G04B 45/02 |
| JP 2002-196086 A | 7/2002 | | |

* cited by examiner

*Primary Examiner* — Renee S Luebke
*Assistant Examiner* — Matthew Daniel Hwang
(74) *Attorney, Agent, or Firm* — Harness, Dickey & Pierce, P.L.C.

(57) ABSTRACT

A timepiece is provided with: a movement having a plurality of timepiece components, and a dial having a decorative plate provided on the movement and a support plate provided on the decorative plate. The decorative plate has a decorative plate ring member provided with a decorative plate opening and a plate member coupled to a decorative plate inner circumference of the decorative plate ring member. The support plate has a support plate ring member provided with a support plate opening and a support member coupled to a support plate inner circumference of the support plate ring member. The plate member is provided below the support plate opening.

7 Claims, 5 Drawing Sheets

TIMEPIECE HAVING DECORATIVE PLATE AND SUPPORT PLATE

The present application is based on, and claims priority from JP Application Serial Number 2022-106881, filed Jul. 1, 2022, the disclosure of which is hereby incorporated by reference herein in its entirety.

BACKGROUND

1. Technical Field

The present disclosure relates to a timepiece.

2. Related Art

There are known timepieces in which the dial includes a plurality of plates. A timepiece described in JP 2002-196086 A is provided with a dial including a base plate and a decorative plate. The base plate has one or more opening portions or transparent portions. The decorative plate is disposed on the upper surface of the base plate, or the lower surface of the base plate, or both. The decorative plate has a cut-out or a window. The decorative plate has a decorative portion formed by the cut-out or the window.

Since the decorative portion is formed on the decorative plate, the portion of the decorative plate other than the cut-out or the window is on the same surface as the decorative portion. As such, the design variation of the dial is limited.

SUMMARY

A timepiece according to the present disclosure is provided with: a movement having a plurality of timepiece components, and a dial having a decorative plate provided on the movement and a support plate provided on the decorative plate, wherein: the decorative plate has a decorative plate ring member provided with a decorative plate opening and a plate member coupled to a decorative plate inner circumference of the decorative plate ring member, the support plate has a support plate ring member provided with a support plate opening and a support member coupled to a support plate inner circumference of the support plate ring member, and the plate member is provided below the support plate opening.

DESCRIPTION OF EXEMPLARY EMBODIMENTS

Figure 1:
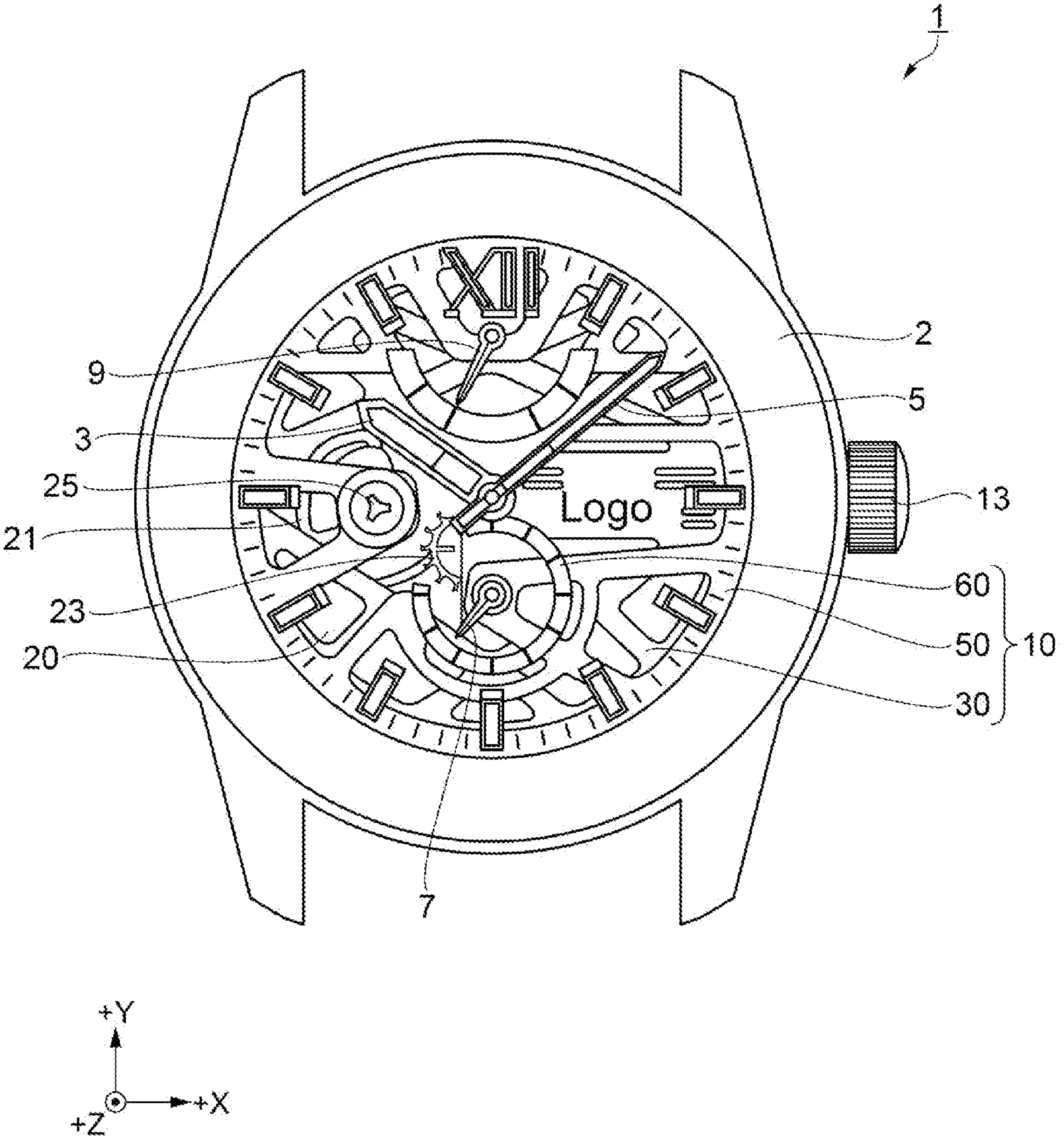
FIG. 1 is a diagram illustrating an external configuration of a mechanical timepiece.

FIG. 1 illustrates an external configuration of a timepiece 1. FIG. 1 is a plan view of the timepiece 1 viewed from a direction facing a dial 10. The timepiece 1 is a mechanical timepiece powered by a mainspring (not illustrated). The timepiece 1 illustrated in FIG. 1 has a see-through structure in which a portion of a timepiece interior component is visible. The timepiece 1 illustrated in FIG. 1 is a small seconds timepiece in which a seconds hand 7 is disposed at a position away from the central shaft.

Figures including FIG. 1 have an XYZ coordinate system. The X-axis is an axis parallel to a placement surface on which the timepiece 1 is placed. The X-axis is an axis parallel to a line coupling an hour mark **60*a* indicating 3 o'clock and an hour mark 60*a* indicating 9 o'clock of the timepiece 1. The hour marks 60*a* will be described later. An +X direction is a direction from the hour mark 60*a* indicating 9 o'clock toward the hour mark 60*a* indicating 3 o'clock. An −X direction is a direction from the hour mark 60*a* indicating 3 o'clock toward the hour mark 60*a* indicating 9 o'clock. The Y-axis is an axis parallel to the placement surface on which the timepiece 1 is placed. The Y-axis is an axis parallel to a line coupling a numerical mark 60*e* indicating 12 o'clock and an hour mark 60*a* indicating 6 o'clock of the timepiece 1. The numerical mark 60*e* will be described later. A +Y direction is a direction from the hour mark 60*a* indicating 6 o'clock toward the numerical mark 60*e*. A −Y direction is a direction from the numerical mark 60*e* toward the hour mark 60*a*** indicating 6 o'clock. The Z-axis is an axis perpendicular to the placement surface. A +Z direction is a direction upward from the placement surface. A −Z direction is a direction downward from the placement surface. The +Z direction corresponds to an upward direction. The −Z direction corresponds to a downward direction.

The timepiece 1 includes an outer case 2, an hour hand 3, a minute hand 5, the seconds hand 7, a power reserve hand 9, a crown 13, and the dial 10. The dial 10 includes a decorative dial 30, a parts support plate 50, and a functional part 60. Details of the dial 10 will be described later. The timepiece 1 illustrated in FIG. 1 has a configuration in which a balance with hairspring 21, an escape wheel and pinion 23, and a cap jewel 25 are visible. The balance with hairspring 21, the escape wheel and pinion 23, and the cap jewel 25 are timepiece interior components. The timepiece interior components each corresponds to an example of a timepiece component.

The outer case 2 accommodates the dial 10 and a movement 20 that will be described later. The outer case 2 accommodates the movement 20 and the dial 10 in this order in the +Z direction. Two openings are provided in the inner region of the outer case 2. Of the two openings, the opening in the +Z direction from the dial 10 is provided with a cover glass (not illustrated). Of the two openings, the opening in the −Z direction from the movement 20 is provided with a case back (not illustrated). The outer case 2 supports the dial 10 and the movement 20 in the inner region.

The hour hand 3, the minute hand 5, and the seconds hand 7 indicate time. The hour hand 3 and the minute hand 5 illustrated in FIG. 1 are attached to an hour hand shaft **3*a* which is one of the hand shafts. The seconds hand 7 illustrated in FIG. 1 is attached to a seconds hand shaft 7*a* which is a hand shaft different from the hour hand shaft 3*a* supporting the hour hand 3 and the minute hand 5. The hour hand 3, the minute hand 5, and the seconds hand 7 are driven by the movement 20**.

The power reserve hand 9 indicates the remaining time. "Power reserve" refers to the amount of time from when the mainspring is fully wound until the mainspring unwinds and stops. The power reserve hand 9 is attached to a power reserve hand shaft **9*a* which is a hand shaft different from the hour hand shaft 3*a* and the seconds hand shaft 7*a***.

The crown 13 is attached to the side surface of the outer case 2. The crown 13 receives operation from the user. The user operates the crown 13 to, for example, wind the mainspring or adjust the time.

The dial 10 is disposed in the inner region of the outer case 2. The dial 10 includes the decorative dial 30 and the parts support plate 50 that is provided on the decorative dial 30. The decorative dial 30 supports the parts support plate 50 directly or via another member. Details of the decorative dial 30 and the parts support plate 50 will be described later.

The balance with hairspring 21 controls the operating speed of the timepiece 1. The balance with hairspring 21 adjusts the speed at which the mainspring unwinds. The balance with hairspring 21 is an example of one of the timepiece interior components of the movement 20. The balance with hairspring 21 is disposed at a position visible from the +Z direction.

The escape wheel and pinion 23 is a component of an escapement. The escapement includes an escape wheel and pinion 23 and a pallet fork (not illustrated). The escapement exerts a reciprocating force on the balance with hairspring 21 and controls a gear train (not illustrated) with regular oscillations of the balance with hairspring 21. The escape wheel and pinion 23 is an example of one of the timepiece interior components of the movement 20. The escape wheel and pinion 23 is disposed at a position visible from the +Z direction.

The cap jewel 25 is provided on a balance staff which is the shaft of the balance with hairspring 21. The balance staff is not illustrated. The cap jewel 25 is provided at the end of the balance staff in the +Z direction. The cap jewel 25 is made of, for example, ruby. The cap jewel 25 is an example of one of the timepiece interior components of the movement 20. The cap jewel 25 is disposed at the 9 o'clock position of the timepiece 1. The cap jewel 25 is provided at a position visible from the +Z direction. A hole jewel is provided surrounding the cap jewel 25. The hole jewel is not illustrated. The hole jewel is a bearing that receives the balance staff. The hole jewel is made of, for example, ruby. The hole jewel may be disposed at a position visible from the +Z direction.

Figure 2:
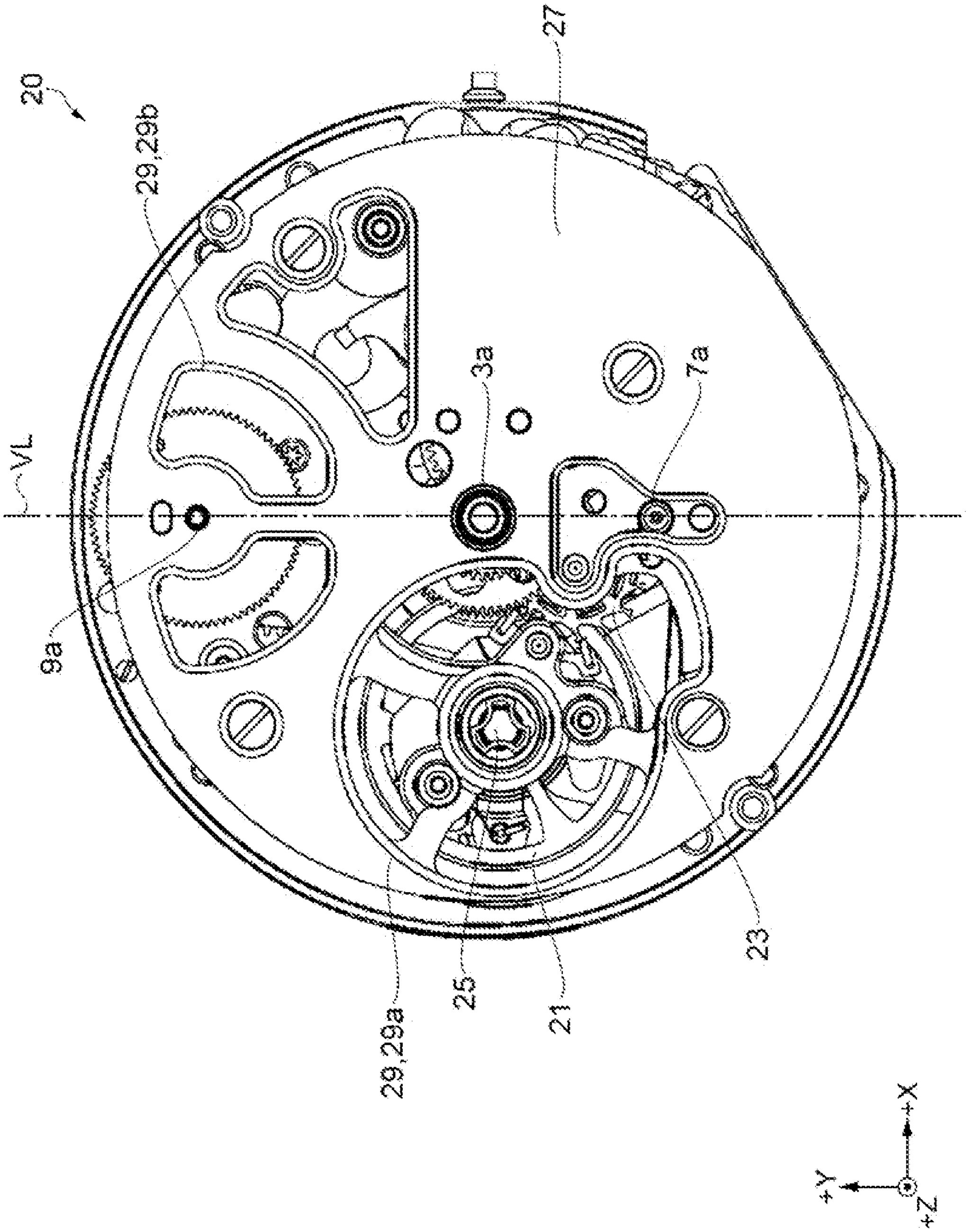
FIG. 2 is a diagram illustrating an external configuration of a movement.

FIG. 2 illustrates an external configuration of the movement 20. FIG. 2 is a diagram of the movement 20 installed in the timepiece 1 viewed from the +Z direction. The movement 20 illustrated in FIG. 2 is placed on the placement surface in an orientation in which an imaginary vertical line VL coupling the hour hand shaft 3*a* and the power reserve hand shaft 9*a* is parallel to the Y-axis.

The movement 20 is provided with the hour hand shaft 3*a*, the seconds hand shaft 7*a*, the power reserve hand shaft 9*a*, the balance with hairspring 21, the escape wheel and pinion 23, the cap jewel 25, and a movement cover 27. The movement 20 is provided with a timepiece interior component that is not illustrated, such as a movement barrel complete, a wheel and pinion, a pallet fork, a balance staff, a hole jewel, and a balance spring. The movement 20 may also be provided with a timepiece interior component such as a date star indicator or a moon phase indicator.

The hour hand shaft 3*a* is a hand shaft to which the hour hand 3 and the minute hand 5 are attached. The hour hand shaft 3*a* is disposed at the center position or a substantially center position of the timepiece 1. The hour hand shaft 3*a* supports the hour hand 3 and the minute hand 5 in a position in the +Z direction of the dial 10.

The seconds hand shaft 7*a* is a hand shaft to which the seconds hand 7 is attached. The seconds hand shaft 7*a* is disposed at a position in the −Y direction of the hour hand shaft 3*a*. The seconds hand shaft 7*a* illustrated in FIG. 2 is disposed on the imaginary vertical line VL. The position of the seconds hand shaft 7*a* is not limited to a position in the −Y direction of the hour hand shaft 3*a*, but is preferably a position in the −Y direction of the hour hand shaft 3*a*. A position in the −Y direction of the hour hand shaft 3*a* is a 6 o'clock position. The 6 o'clock position is an area in the −Y direction of the hour hand shaft 3*a* defined by an imaginary line inclined at +45° to the imaginary vertical line VL and an imaginary line inclined at −45° to the imaginary vertical line VL. The seconds hand shaft 7*a* supports the seconds hand 7 in a position in the +Z direction of the dial 10.

The power reserve hand shaft 9*a* is a hand shaft to which the power reserve hand 9 is attached. The power reserve hand shaft 9*a* is disposed at a position in the +Y direction of the hour hand shaft 3*a*. The position of the power reserve hand shaft 9*a* is not limited to a position in the +Y direction of the hour hand shaft 3*a*, but is preferably a position in the +Y direction of the hour hand shaft 3*a*. A position of the hour hand shaft 3*a* in the +Y direction is a 12 o'clock position. The 12 o'clock position is an area in the +Y direction of the hour hand shaft 3*a* defined by an imaginary line inclined at +45° to the imaginary vertical line VL and an imaginary line inclined at −45° to the imaginary vertical line VL. The power reserve hand shaft 9*a* supports the power reserve hand 9 in a position in the +Z direction of the dial 10.

The balance with hairspring 21 and the cap jewel 25 are disposed at a position in the −X direction of imaginary vertical line VL. The cap jewel 25 and the center of the balance with hairspring 21 are disposed at the 9 o'clock position of the timepiece 1. The 9 o'clock position is an area in the −X direction of the imaginary vertical line VL defined by an imaginary line inclined at +45° to an imaginary horizontal line and an imaginary line inclined at −45° to the imaginary horizontal line, the imaginary horizontal line being a line that passes through the hour hand shaft 3*a* and that is perpendicular to the imaginary vertical line VL.

The escape wheel and pinion 23 is disposed at a position between the seconds hand shaft 7*a* and the balance with hairspring 21. The center of the escape wheel and pinion 23 is disposed at a position in the −X direction of the imaginary vertical line VL. The escape wheel and pinion 23 is disposed at a position adjacent to the balance with hairspring 21.

The movement cover 27 is an exterior member that covers the timepiece interior components. A portion of the movement cover 27 is provided at a position in the +Z direction of the timepiece interior components. The movement cover 27 is provided with a movement opening 29. The movement cover 27 corresponds to an example of a cover. The movement opening 29 corresponds to an example of an opening.

The movement opening 29 has a configuration in which timepiece interior components are visible. The movement opening 29 illustrated in FIG. 2 has a plurality of opening areas including a first movement opening area 29*a* and a second movement opening area 29*b*. The movement opening 29 has a plurality of opening areas, but is not limited thereto. The movement opening 29 may have one opening area.

The first movement opening area 29*a* is provided at a position in the −X direction of the imaginary vertical line VL. The first movement opening area 29*a* is provided at a position in the +Z direction of the balance with hairspring 21, the escape wheel and pinion 23, and the cap jewel 25. The first movement opening area 29*a* is provided at a position where a portion of the escape wheel and pinion 23 is visible. With the first movement opening area 29*a* provided, the user can visually recognize timepiece interior components, such as the balance with hairspring 21, the escape wheel and pinion 23, and the cap jewel 25.

The second movement opening area 29*b* is provided at a position in the +X direction of the imaginary vertical line VL. The second movement opening area 29*b* is provided at a position different from the position of the first movement opening area 29*a*. The second movement opening area 29*b* is provided at a position where a timepiece interior component related to driving of the power reserve hand 9 is visible.

Figure 3:
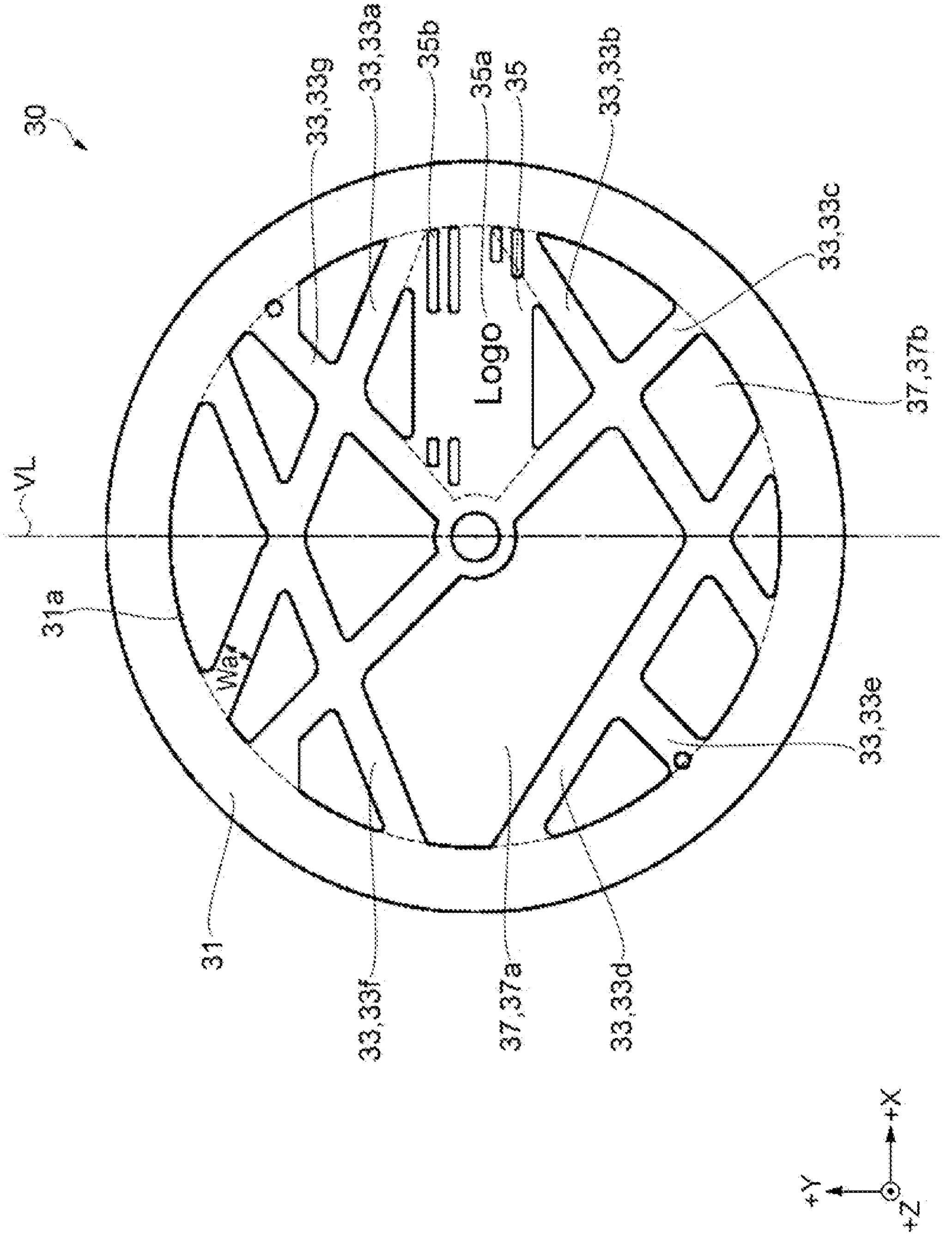
FIG. 3 is a diagram illustrating a schematic configuration of a decorative dial.

FIG. 3 illustrates a schematic configuration of the decorative dial 30. FIG. 3 is a diagram of the decorative dial 30 viewed from the +Z direction. FIG. 3 illustrates the decorative dial 30 in a position installed on the timepiece 1. The decorative dial 30 includes a decorative dial ring 31, a beam member 33, and an image display plate 35. The decorative dial 30 is configured to have a predetermined color. The decorative dial 30 is preferably configured to have a dark color such as black. With the decorative dial 30 configured to have a dark color, the perceived depth of the dial 10 is increased. The decorative dial 30 corresponds to an example of a decorative plate.

The decorative dial ring 31 is disposed on the outer circumferential edge of the decorative dial 30. The decorative dial ring 31 is supported by the outer case 2 or the movement 20. The decorative dial ring 31 has a decorative dial inner circumferential surface 31*a* at the inner circumferential portion. The inside of the decorative dial inner circumferential surface 31*a* is a decorative dial opening 37. The decorative dial ring 31 illustrated in FIG. 3 is a circular ring, but the decorative dial ring 31 is not limited to a circular ring. The shape of the decorative dial ring 31 is not limited as long as the decorative dial ring 31 has an opening at the inner circumferential portion. The decorative dial ring 31 may have a rectangular shape. The decorative dial ring 31 corresponds to an example of a decorative plate ring member. The decorative dial inner circumferential surface 31*a* corresponds to an example of a decorative plate inner circumference.

The beam member 33 is coupled to the decorative dial inner circumferential surface 31*a* of the decorative dial ring 31. In FIG. 3, a plurality of the beam members 33 are coupled to the decorative dial inner circumferential surface 31*a*. The beam member 33 is a plate-shaped member coupling any two points on the decorative dial inner circumferential surface 31*a*, or a plate-shaped member coupling the decorative dial inner circumferential surface 31*a* with another beam member 33. The beam member 33 may also be a plate-shaped member coupling another two beam members 33. A beam member width Wa of the beam member 33 can be set as appropriate. The beam member width Wa of the beam member 33 may change depending on the position. The beam member widths Wa of the plurality of the beam members 33 may be different from each other. A thickness of the beam member 33 along the Z-axis is the same as a thickness of the decorative dial ring 31 along the Z-axis, but is not limited thereto. The thickness of the beam member 33 along the Z-axis may be greater or less than the thickness of the decorative dial ring 31 along the Z-axis. The beam member 33 and the decorative dial ring 31 are formed as one piece. The beam member 33 corresponds to an example of a plate member. The beam member width Wa corresponds to an example of a plate member width.

The plurality of the beam members 33 illustrated in FIG. 3 are a first beam member 33*a*, a second beam member 33*b*, a third beam member 33*c*, a fourth beam member 33*d*, a fifth beam member 33*e*, a sixth beam member 33*f*, and a seventh beam member 33*g*. The number of the beam members 33 illustrated in FIG. 3 is seven, but the number of the beam members 33 is not limited thereto. The number of the beam members 33 may be six or less, or may be eight or more.

The first beam member 33*a*, the second beam member 33*b*, the third beam member 33*c*, the fourth beam member 33*d*, and the sixth beam member 33*f* couple two points on the decorative dial inner circumferential surface 31*a*. The beam member width Wa of the first beam member 33*a* is constant throughout the entire length of the first beam member 33*a*. A ring portion is formed at the center of the third beam member 33*c*. The ring portion is provided at the center position of the decorative dial 30. The hour hand shaft 3*a* to which the hour hand 3 and the minute hand 5 are attached is inserted into the ring portion. The first beam member 33*a* and the sixth beam member 33*f* are disposed at positions that are symmetrical with respect to the imaginary vertical line VL. The imaginary vertical line VL is an axis parallel to the Y-axis passing through the center of the decorative dial 30. The second beam member 33*b* and the fourth beam member 33*d* are disposed at positions that are symmetrical with respect to the imaginary vertical line VL.

The fifth beam member 33*e* and the seventh beam member 33*g* couple the decorative dial inner circumferential surface 31*a* and the beam member 33. The fifth beam member 33*e* couples the decorative dial inner circumferential surface 31*a* and the fourth beam member 33*d*. The seventh beam member 33*g* couples the decorative dial inner circumferential surface 31*a* and the third beam member 33*c*. The fifth beam member 33*e* is disposed at a position on the extension from the seventh beam member 33*g*.

The image display plate 35 is supported by the beam member 33 and the decorative dial inner circumferential surface 31*a*. The image display plate 35 illustrated in FIG. 3 is supported by the first beam member 33*a*, the second beam member 33*b*, the third beam member 33*c*, and the seventh beam member 33*g*. The image display plate 35 and the plurality of the beam members 33 are formed as one piece. The image display plate 35 corresponds to an example of a display plate.

A display image 35*a* is displayed on the image display plate 35. The display image 35*a* includes a logotype indicating the brand name, the manufacturer name, or other information about the timepiece 1, or a logomark that can be used to identify the brand. The display image 35*a* may include a plurality of text strings, designs, and the like. The display image 35*a* corresponds to an example of an identification image.

A plurality of slits 35*b* are formed in the image display plate 35. The slits 35*b* are provided at positions different from the position of the display image 35*a*. The plurality of slits 35*b* may be not provided, but are preferably provided. With the slits 35*b* provided, the dial 10 has improved design variation.

The decorative dial opening 37 is divided into a plurality of areas by the beam member 33. The decorative dial opening 37 is divided into a plurality of areas including a first decorative dial opening area 37*a* and a second decorative dial opening area 37*b*. The first decorative dial opening area 37*a* and the second decorative dial opening area 37*b* are a portion of the decorative dial opening 37. The decorative dial opening 37 corresponds to an example of a decorative plate opening.

The first decorative dial opening area 37*a* is provided at a position in the +Z direction of the first movement opening area 29*a* illustrated in FIG. 2. The first decorative dial opening area 37*a* is an area including the positions of a portion of the balance with hairspring 21, a portion of the escape wheel and pinion 23, and the cap jewel 25 in the +Z direction. The second decorative dial opening area 37*b* is provided at a position in the +Z direction of the movement cover 27. The second decorative dial opening area 37*b* is an area including the position of the movement cover 27 in the +Z direction.

Figure 4:
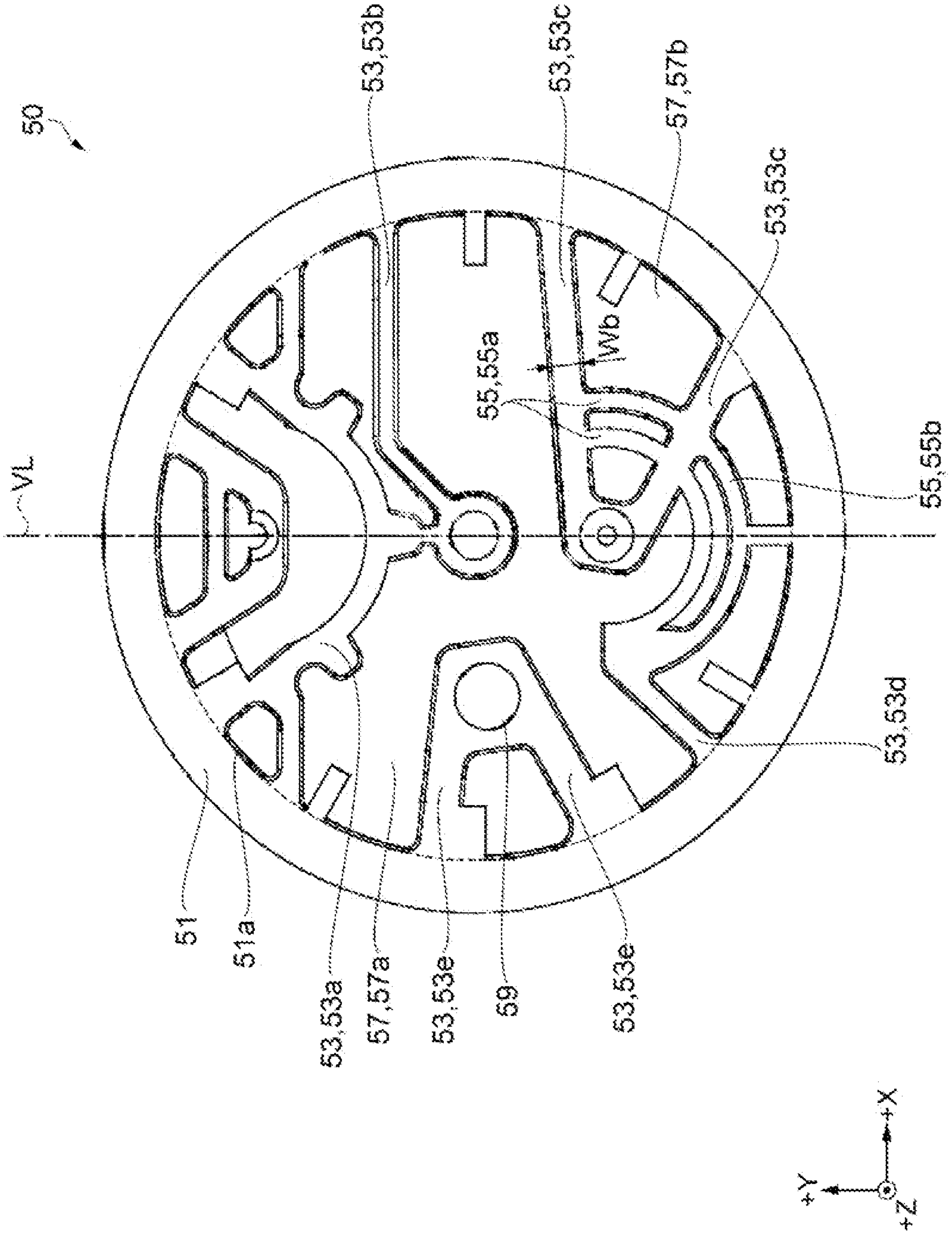
FIG. 4 is a diagram illustrating a schematic configuration of a parts support plate.

FIG. 4 illustrates a schematic configuration of the parts support plate 50. FIG. 4 is a diagram of the parts support plate 50 viewed from the +Z direction. FIG. 4 illustrates the parts support plate 50 in a position installed on the timepiece 1. The parts support plate 50 is provided with a parts support plate ring 51, a plurality of bridges 53, and an auxiliary member 55. The parts support plate 50 corresponds to an example of a support plate.

The color of the parts support plate 50 is preferably different from the color of the decorative dial 30. For example, the color of the decorative dial 30 is a dark color while the color of the parts support plate 50 is a light color. Alternatively, the color of the decorative dial 30 may be black, which is an example of a dark color, while the color of the parts support plate 50 may be a dark color different from the black color of the decorative dial 30. With the color of the decorative dial 30 being different from the color of the parts support plate 50, the dial 10 has an improved three-dimensional effect. The black color and the dark color correspond to an example of a first color. The light color or the dark color different from the black color corresponds to an example of a second color.

Preferably, the decorative dial 30 is in black while the parts support plate 50 is in a dark color different from black or is in a light color.

With the color of the decorative dial 30 being different from the color of the parts support plate 50, the design variation is improved. In addition, the three-dimensional effect of the dial 10 is improved.

The parts support plate ring 51 is disposed at the outer circumferential edge of the parts support plate 50. The parts support plate ring 51 is supported by the decorative dial 30. The parts support plate ring 51 has a parts support plate inner circumferential surface 51*a* at the inner circumferential portion. The inside of the parts support plate inner circumferential surface 51*a* is a parts support plate opening 57. The parts support plate ring 51 illustrated in FIG. 4 has a circular shape, but the shape of the parts support plate ring 51 is not limited to a circular shape. The shape of the parts support plate ring 51 is not limited as long as the parts support plate ring 51 has an opening at the inner circumferential portion. The parts support plate ring 51 may have a rectangular shape. The shape of the parts support plate ring 51 is preferably the same as the shape of the decorative dial ring 31. The parts support plate ring 51 corresponds to an example of a support plate ring member. The parts support plate inner circumferential surface 51*a* corresponds to an example of a support plate inner circumference.

The bridge 53 supports the functional part 60 that will be described later. The bridge 53 is coupled to the parts support plate inner circumferential surface 51*a* of the parts support plate ring 51. In FIG. 4, the plurality of the bridges 53 are coupled to the parts support plate inner circumferential surface 51*a*. The two ends of the bridge 53 are coupled to the parts support plate inner circumferential surface 51*a*. One of the two ends of the bridge 53 may be coupled to the parts support plate inner circumferential surface 51*a* while the other end may be not coupled to the parts support plate inner circumferential surface 51*a*. The two ends of the bridge 53 may be coupled to the parts support plate inner circumferential surface 51*a* and another bridge 53. A thickness of the bridge 53 along the Z-axis is the same as a thickness of the parts support plate ring 51 along the Z-axis, but is not limited thereto. The thickness of the bridge 53 along the Z-axis may be greater or less than the thickness of the parts support plate ring 51 along the Z-axis. The bridge 53 and the parts support plate ring 51 are formed as one piece. The bridge 53 corresponds to an example of a support member.

The plurality of the bridges 53 include a first bridge 53*a*, a second bridge 53*b*, a third bridge 53*c*, a fourth bridge 53*d*, and a fifth bridge 53*e*. The number of the bridges 53 is not limited to five. The number of the bridges 53 may be any from one to four, or may be six or more. The bridge 53 is disposed in a position corresponding to the position where the functional part 60 is disposed. Any one of the first bridge 53*a*, the second bridge 53*b*, the third bridge 53*c*, the fourth bridge 53*d*, and the fifth bridge 53*e* corresponds to an example of a support member, a second support member, or a third support member.

The two ends of the first bridge 53*a*, the third bridge 53*c*, and the fifth bridge 53*e* are supported by the parts support plate inner circumferential surface 51*a*. The first bridge 53*a* is configured to have an arc portion. The third bridge 53*c* is configured to have a V shape. The third bridge 53*c* is provided with an insertion hole. The seconds hand shaft 7*a* is inserted into the insertion hole. The fifth bridge 53*e* is provided with an attachment hole 59. The functional part 60 is attached to the attachment hole 59.

The two ends of the second bridge 53*b* and the fourth bridge 53*d* are coupled to the parts support plate inner circumferential surface 51*a* and another bridge 53. The two ends of the second bridge 53*b* are coupled to the parts support plate inner circumferential surface 51*a* and the first bridge 53*a*. The second bridge 53*b* is configured to have a ring portion. The ring portion is disposed at the center of the parts support plate 50. The hour hand shaft 3*a* is inserted into the ring portion. The fourth bridge 53*d* couples the parts support plate ring 51 and the third bridge 53*c*. The fourth bridge 53*d* is configured to have an arc portion.

A bridge width Wb of the bridge 53 can be set as appropriate. As illustrated in FIG. 4, the bridge width Wb of the second bridge 53*b* is less than the bridge width Wb of the fifth bridge 53*e*. With the bridge widths Wb of the bridges 53 being different from each other, the dial 10 has improved design variation. The bridge widths Wb of the bridges 53 may be unvaried. The bridge width Wb corresponds to an example of a support member width.

The two ends of the auxiliary member 55 are coupled to the bridge 53. The auxiliary member 55 modifies the bridge 53. The auxiliary member 55 may reinforce the bridge 53. A plurality of the auxiliary members 55 include a first auxiliary member 55*a* and a second auxiliary member 55*b*. The first auxiliary member 55*a* is coupled to the third bridge 53*c*. The second auxiliary member 55*b* is coupled to the third bridge 53*c* and the fourth bridge 53*d*. The first auxiliary member 55*a* and the second auxiliary member 55*b* may be provided or may be not provided. An auxiliary member 55 different from the first auxiliary member 55*a* and the second auxiliary member 55*b* may be provided. The auxiliary member 55 and the bridge 53 are formed as one piece.

The parts support plate opening 57 is divided into a plurality of areas by the bridge 53. The parts support plate opening 57 is divided into a plurality of areas including a first parts support plate opening area 57*a* and a second parts support plate opening area 57*b*. The first parts support plate opening area 57*a* and the second parts support plate opening area 57*b* are a portion of the parts support plate opening 57.

The parts support plate opening 57 corresponds to an example of a support plate opening.

The first parts support plate opening area 57*a* is provided at a position in the +Z direction with respect to the movement opening 29. The first parts support plate opening area 57*a* is provided at a position in the +Z direction with respect to a portion of the balance with hairspring 21 and a portion of the escape wheel and pinion 23. The first parts support plate opening area 57*a* is provided at a position in the +Z direction of the image display plate 35. The second parts support plate opening area 57*b* is provided at a position in the +Z direction of the movement cover 27.

Figure 5:
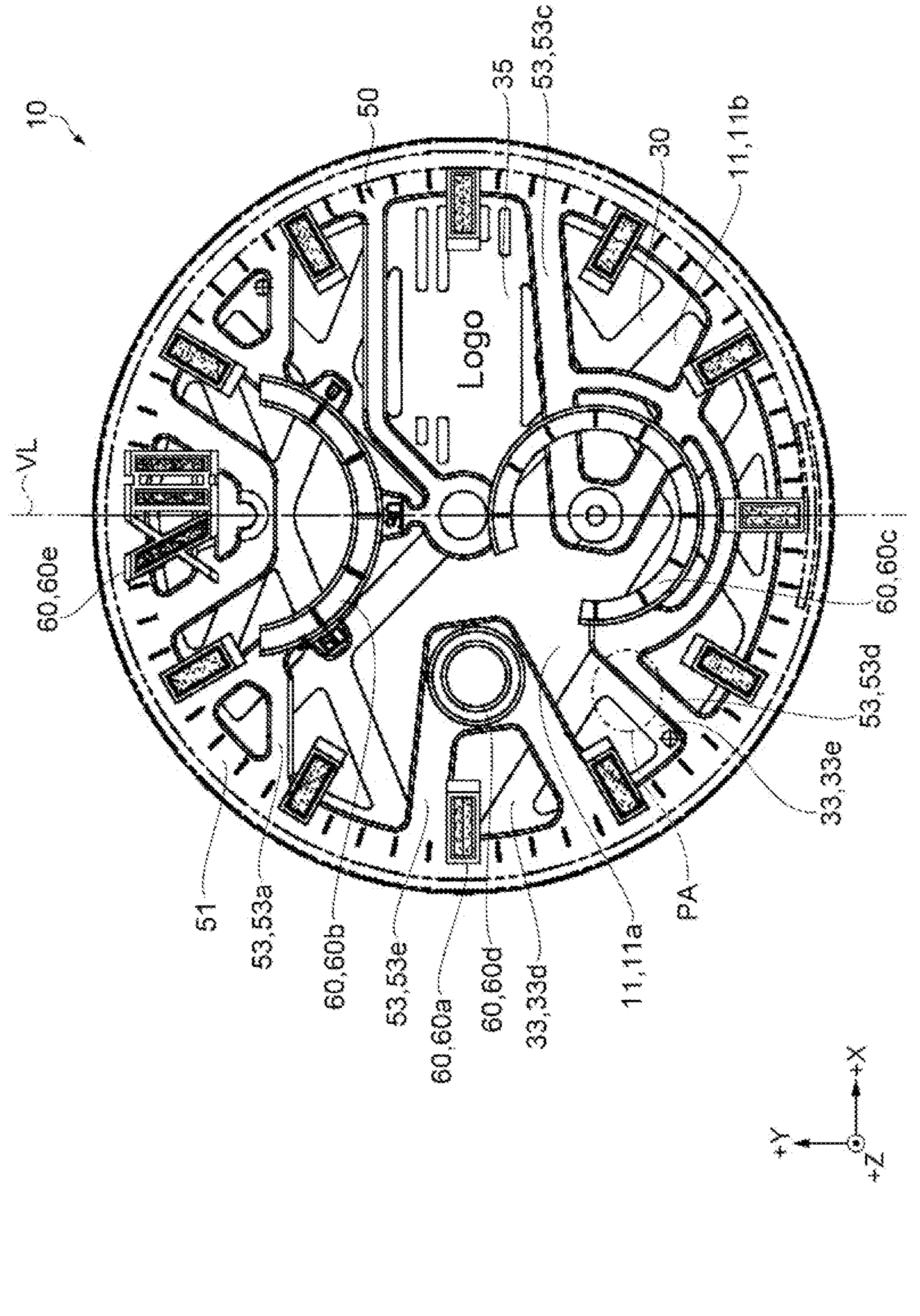
FIG. 5 is a diagram illustrating a schematic configuration of a dial.

FIG. 5 illustrates a schematic configuration of the dial 10. FIG. 5 is a diagram of the dial 10 viewed from the +Z direction. FIG. 5 illustrates the dial 10 in a position installed on the timepiece 1. FIG. 5 illustrates the decorative dial 30, the parts support plate 50, and a plurality of the functional parts 60.

The dial 10 has the decorative dial 30 and the parts support plate 50 disposed on the decorative dial 30. The decorative dial 30 and the parts support plate 50 are attached by an engaging mechanism (not illustrated). An example of the engaging mechanism includes an engaging member and a receiving portion. The engaging member is provided on the decorative dial 30 while the receiving portion is provided on the parts support plate 50; or, the engaging member is provided on the parts support plate 50 while the receiving portion is provided on the decorative dial 30. With the engaging member and the receiving portion engaged, the parts support plate 50 is joined to the decorative dial 30. The dial 10 has a configuration in which a portion of the decorative dial 30 is visible from the +Z direction. With the decorative dial 30 and the parts support plate 50 visibly disposed, the perceived depth of the dial 10 is improved.

The plurality of the functional parts 60 are disposed on the parts support plate 50. The functional part 60 is supported by the parts support plate 50. The functional part 60 is attached to the parts support plate 50 by an attachment mechanism (not illustrated). An example of the attachment mechanism includes an attachment protrusion and a hole. The attachment protrusion is provided on the functional part 60 while the hole is provided on the parts support plate 50; or, the attachment protrusion is provided on the parts support plate 50 while the hole is provided on the functional part 60. With the attachment protrusion attached to the hole, the functional part 60 is joined to the parts support plate 50. The functional part 60 may be joined to the parts support plate 50 by an adhesive or the like. The functional part 60 corresponds to an example of a part.

The functional part 60 illustrated in FIG. 5 includes a plurality of the hour marks 60*a*, a power reserve mark 60*b*, a sub-dial mark 60*c*, a decorative ring 60*d*, and the numerical mark 60*e*. The functional part 60 is not limited to the hour mark 60*a*, the power reserve mark 60*b*, the sub-dial mark 60*c*, the decorative ring 60*d*, and the numerical mark 60*e*. Any one of the hour mark 60*a*, the power reserve mark 60*b*, the sub-dial mark 60*c*, the decorative ring 60*d*, and the numerical mark 60*e* corresponds to an example of a part, a second part, or a third part.

The hour mark 60*a* is an index indicating the hour or the minute. The plurality of the hour marks 60*a* are supported by the parts support plate 50. The hour mark 60*a* projects from and is supported by the parts support plate opening 57 of the parts support plate 50. The hour mark 60*a* may be supported by the bridge 53.

The power reserve mark 60*b* is an indicator of the remaining drive time of the timepiece 1. The power reserve mark 60*b* is supported by the first bridge 53*a* at the 12 o'clock position. The power reserve mark 60*b* is disposed at the 12 o'clock position. The power reserve mark 60*b* corresponds to an example of a part. The power reserve mark 60*b* corresponds to an example of a power reserve indicator part. The first bridge 53*a* corresponds to an example of a support member.

The sub-dial mark 60*c* displays a seconds indicator of the seconds of a minute. The sub-dial mark 60*c* is supported by the third bridge 53*c* and the fourth bridge 53*d* at the 6 o'clock position. The sub-dial mark 60*c* is disposed at the 6 o'clock position. The sub-dial mark 60*c* corresponds to an example of a second part. The sub-dial mark 60*c* corresponds to an example of a seconds indicator part. The third bridge 53*c* or the fourth bridge 53*d* corresponds to an example of a second support member.

The decorative ring 60*d* is a member displaying the cap jewel 25. The decorative ring 60*d* is supported by the fifth bridge 53*e* at the 9 o'clock position. The decorative ring 60*d* is disposed at the 9 o'clock position. The decorative ring 60*d* is attached to the attachment hole 59 of the fifth bridge 53*e*. The inner region of the decorative ring 60*d* is a hole and is configured to be visible in the −Z direction. The user can visually recognize the cap jewel 25 through the hole in the decorative ring 60*d*. The decorative ring 60*d* corresponds to an example of a third part. The decorative ring 60*d* corresponds to an example of a decorative part. The fifth bridge 53*e* corresponds to an example of a third support member.

The numerical mark 60*e* is an index indicating the hour or the minute. The numerical mark 60*e* is a type of the hour mark 60*a*. The numerical mark 60*e* is an index indicating 12 o'clock. The numerical mark 60*e* is supported by the parts support plate 50. The numerical mark 60*e* projects from and is supported by the parts support plate opening 57 of the parts support plate 50. The numerical mark 60*e* may be supported by the bridge 53.

The parts support plate 50 preferably supports the functional part 60 provided on the bridge 53.

With the position of the functional part 60 disposed along the Z-axis being different from the position of the parts support plate 50 disposed along the Z-axis, the perceived depth of the dial 10 is increased.

The plurality of timepiece interior components include the cap jewel 25. The parts support plate 50 has the first bridge 53*a* supporting the power reserve mark 60*b*, the third bridge 53*c* supporting the sub-dial mark 60*c*, and the fifth bridge 53*e* supporting the decorative ring 60*d*. The power reserve mark 60*b* relates to the remaining drive time. The sub-dial mark 60*c* relates to the seconds of a minute. The decorative ring 60*d* displays the cap jewel 25.

Since the plurality of functional parts 60 are supported by the different bridges 53, the dial 10 has an intricate configuration, which improves the design of the dial 10.

As illustrated in FIG. 5, when the dial 10 is viewed from the +Z direction, the user can visually recognize the beam members 33 and the bridges 53. The beam members 33 are provided at positions overlapping and not overlapping the bridges 53 disposed in the +Z direction. With the beam members 33 provided at positions overlapping and not overlapping the bridges 53, the dial 10 has improved design variation.

FIG. 5 illustrates a partial area PA of the dial 10. In the partial area PA, the fourth bridge 53*d* and the fifth beam member 33*e* are disposed at positions overlapping each other along the Z-axis. The beam member width Wa of the fifth beam member 33*e* is greater than the bridge width Wb of the fourth bridge 53*d*. With the fifth beam member 33*e* visibly disposed in the −Z direction of the fourth bridge 53*d*, the presence of the fourth bridge 53*d* is emphasized.

The bridge width Wb of the bridge 53 is preferably greater than the beam member width Wa of the beam member 33. For example, the bridge width Wb of the fifth bridge 53*e* is greater than the beam member width Wa of the fourth beam member 33*d*. The fourth beam member 33*d* is visibly disposed in the −Z direction of the fifth bridge 53*e*. The fourth beam member 33*d* is disposed in a position that partially overlaps the fifth bridge 53*e* along the Z-axis. With the bridge width Wb of the fifth bridge 53*e* being greater than the beam member width Wa of the fourth beam member 33*d*, the sense of perspective is emphasized, and the dial 10 has an improved three-dimensional effect. With the bridge width Wb of the bridge 53 being greater than the beam member width Wa of the beam member 33, the beam member 33 can have a configuration in which the beam member 33 is hidden by the bridge 53 when the user views the dial 10 from the +Z direction.

The beam member width Wa of the beam member 33 is preferably different from the bridge width Wb of the bridge 53.

With the beam member width Wa of the beam member 33 being different from the bridge width Wb of the bridge 53, the dial 10 has improved design variation. This provides the dial 10 that has an intricate design.

The bridge width Wb of the bridge 53 is preferably greater than the beam member width Wa of the beam member 33.

With the bridge width Wb of the bridge 53 being greater than the beam member width Wa of the beam member 33, the sense of perspective is emphasized, and the dial 10 has an improved three-dimensional effect.

When the decorative dial 30 and the parts support plate 50 overlap along the Z-axis, a dial opening 11 is formed in the dial 10. The dial opening 11 is an opening portion penetrating the dial 10. The dial opening 11 is an area where the decorative dial opening 37 and the parts support plate opening 57 overlap along the Z-axis. The dial opening 11 is an area in which the beam member 33 and the bridge 53 are not disposed along the Z-axis. With the dial opening 11 formed, the movement 20 or the inside of the movement 20 is visible. When viewing the timepiece 1 from the +Z direction, the user can visually recognize the movement opening 29 or the movement cover 27 that are located in the −Z direction of the dial opening 11. The user can visually recognize timepiece interior components located in the −Z direction of the dial opening 11, such as the balance with hairspring 21, the escape wheel and pinion 23, and the cap jewel 25.

The dial opening 11 is divided into a plurality of areas. In an exampled illustrated in FIG. 5, a plurality of the dial openings 11 includes a first dial opening area 11*a* and a second dial opening area 11*b*.

The first dial opening area 11*a* is provided at a position in the +Z direction of the movement opening 29. A portion of the movement opening 29 is located at a position in the −Z direction of the first dial opening area 11*a*. The first dial opening area 11*a* is provided at a position in the +Z direction of a portion of the balance with hairspring 21 and a portion of the escape wheel and pinion 23 that are disposed in the movement opening 29. The user can visually recognize a portion of the balance with hairspring 21 and a portion of the escape wheel and pinion 23 from the +Z direction through the first dial opening area 11*a*. The first dial opening area 11*a* is provided at a position in the −Z direction of the decorative ring 60*d*. The user can visually recognize the cap jewel 25 through the hole of the decorative ring 60*d* and the first dial opening area 11*a*.

The second dial opening area 11*b* is provided at a position in the +Z direction of the movement cover 27. The user can visually recognize the movement cover 27 through the second dial opening area 11*b*. The user can visually recognize timepiece interior components disposed inside the movement 20 and the movement cover 27 through the dial opening 11. The user can feel a three-dimensional effect from the dial 10.

The movement 20 has the movement cover 27 provided with the movement opening 29. A portion of the movement opening 29 is provided in the −Z direction of the decorative dial opening 37 and the parts support plate opening 57.

Timepiece interior components in the movement 20 are visible. This improves the design of the dial 10.

The image display plate 35 of the decorative dial 30 is disposed at a position in the −Z direction of the first parts support plate opening area 57*a*. The image display plate 35 is visible to the user through the first parts support plate opening area 57*a*. The image display plate 35 is disposed at a 3 o'clock position of the dial 10. The 3 o'clock position is an area in the +X direction of the imaginary vertical line VL defined by an imaginary line inclined at +45° to an imaginary horizontal line and an imaginary line inclined at −45° to the imaginary horizontal line, the imaginary horizontal line being a line that passes through the hour hand shaft 3*a* and that is perpendicular to the imaginary vertical line VL.

The decorative dial 30 has the image display plate 35 that is supported by the beam member 33 and that displays the display image 35*a*. The image display plate 35 is provided in the −Z direction of the parts support plate opening 57.

The image display plate 35 is provided in the −Z direction of the parts support plate 50. The image display plate 35 is visible deep inside the dial 10. This provides the dial 10 in which the image display plate 35 is inconspicuous to the user.

Preferably, the power reserve mark 60*b* is supported at the 12 o'clock position, the sub-dial mark 60*c* is supported at the 6 o'clock position, and the decorative ring 60*d* is supported at the 9 o'clock position. The image display plate 35 is preferably disposed at the 3 o'clock position.

The power reserve mark 60*b*, the image display plate 35, the sub-dial mark 60*c*, and the cap jewel 25 decorated with the decorative ring 60*d* are disposed in a well-balanced manner.

The timepiece 1 is provided with the movement 20 and the dial 10. The movement 20 has the plurality of timepiece interior components. The dial 10 has the decorative dial 30 provided on the movement 20 and the parts support plate 50 provided on the decorative dial 30. The decorative dial 30 has the decorative dial ring 31 provided with the decorative dial opening 37 and the beam member 33 coupled to the decorative dial inner circumferential surface 31*a* of the decorative dial ring 31. The parts support plate 50 includes the parts support plate ring 51 provided with the parts support plate opening 57 and the bridge 53 coupled to the parts support plate inner circumferential surface 51*a* of the parts support plate ring 51. The beam member 33 is provided in the −Z direction of the parts support plate opening 57.

The position of the bridge 53 coupled to the parts support plate ring 51 along the Z-axis is different from the position of the beam member 33 along the Z-axis. The bridge 53 is disposed at a position in the +Z direction of the beam member 33. The bridge 53 and the beam member 33 are visible to the user in different perceived depths. This enables the design of the dial 10 in which the bridge 53 and the beam member 33 have different visibilities, thus improving the design variation of the dial 10.

What is claimed is:

1. A timepiece comprising:

a movement having a plurality of timepiece components; and a dial including a decorative plate provided on the movement and a support plate provided on the decorative plate; wherein the decorative plate has a decorative plate ring member provided with a plurality of decorative plate openings and a plurality of plate members coupled to a decorative plate inner circumference of the decorative plate ring member;

the support plate has a support plate ring member provided with a plurality of support plate openings and a plurality of support members coupled to a support plate inner circumference of the support plate ring member;

the plurality of plate members are provided below the plurality of support plate openings;

the plurality of plate members are visible through the plurality of support plate openings provided in the support plate, and the plurality of plate members intersect the plurality of support members in a plan view of the dial;

the plurality of timepiece components include a cap jewel;

the support plate has a first support member of the plurality of support members that supports a first part, a second support member of the plurality of support members that supports a second part, and a third support member of the plurality of support members that supports a third part;

the first part is a power reserve indicator part that relates to a remaining drive time;

the second part is a seconds indicator part that relates to the seconds of a minute; and the third part is a decorative part displaying the cap jewel.

2. The timepiece according to claim 1, wherein the decorative plate includes a display plate that is supported by a first plate member of the plurality of plate members and that displays an identification image; and the display plate is provided below one of the plurality of support plate openings.

3. The timepiece according to claim 2, wherein the power reserve indicator part is supported at a 12 o'clock position;

the seconds indicator part is supported at a 6 o'clock position;

the decorative part is supported at a 9 o'clock position; and the display plate is disposed at a three o'clock position.

4. The timepiece according to claim 1, wherein the movement has a cover provided with an opening; and a portion of the opening is provided below one of the decorative plate openings and one of the support plate openings.

5. The timepiece according to claim 1, wherein a plate member width of each of the plurality of plate members is different from a support member width of each of the plurality of support members.

6. The timepiece according to claim 5, wherein the support member width of each of the plurality of support members is greater than the plate member width of each of the plurality of plate members.

7. The timepiece according to claim 1, wherein the decorative plate is in a first color; and the support plate is in a second color that is different from the first color.

* * * * *